(No Model.)
P. M. BURNS.
FLOUR SIFTER WITH REVERSIBLE CLOSED BOTTOM AND COVER.
No. 491,008. Patented Jan. 31, 1893.
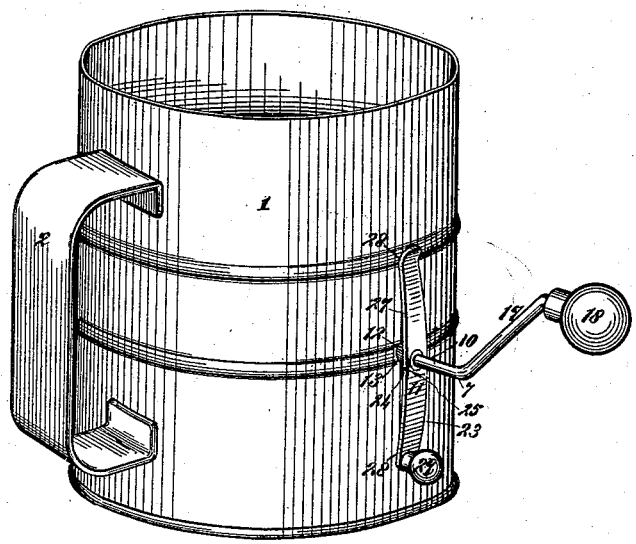
Attest:
Charles Pickles.
George E. Cruet.
Inventor:
Priscilla M. Burns.
By Knight Bros.
attys.

UNITED STATES PATENT OFFICE.

PRISCILLA M. BURNS, OF ST. LOUIS, MISSOURI.

FLOUR-SIFTER WITH REVERSIBLE CLOSED BOTTOM AND COVER.

SPECIFICATION forming part of Letters Patent No. 491,008, dated January 31, 1893.

Application filed February 9, 1892. Serial No. 420,854. (No model.)

*To all whom it may concern:*

Be it known that I, PRISCILLA M. BURNS, of the city of St. Louis, in the State of Missouri, have invented a certain new and useful Improvement in Flour-Sifters with Reversible Closed Bottom and Cover, of which the following is a full, clear, and exact description, reference being had to the accompanying drawings, forming part of this specification.

This invention relates to a rotary flour sifter, that has an alternating, semi-spheric tight bottom and cover, which in its bottom capacity, when not sifting securely retains the flour from escape, and which when said bottom is reversed in its elevated position when sifting, prevents the scattering of the flour by the sifter over the top of the sifter can.

Figure I is a perspective view of the can, and shows the sifter crank, and the rotatable arm with its hand knob, by which the semi-spheric alternating tight bottom and cover is inverted. Fig. II is a vertical section, taken on line II—II, Fig. III, and shows in full lines the semi-spheric, alternating tight bottom and cover, adjusted into its lower position, for preventing the escape of the flour at the bottom of the apparatus previous to sifting, it also shows in broken lines, the said semi-spheric element in its elevated position in which it prevents the upward escape of the flour, while sifting; and Fig. III is a vertical section, partly in elevation, the section taken on line III—III, Fig. II and shows the semi-spheric alternating bottom and cover in its elevated position as a cover to prevent the upward escape of flour, while sifting.

Referring to the drawings:—1 represents the flour-can, which is of convenient form for scooping up the flour from the barrel or sack, when it is desired to replenish the same. 2 is the handle of said can.

3 represents a semi-spheric wire woven screen, whose upper peripheral edge 4 is seated within a circumferential groove 5 around the inside of said can, and is there secured by solder or otherwise. The bulge 6 of said semi-spheric screen lacks sufficiently from reaching on line with the bottom of the can, to prevent its coming in contact with the table, or any other flat object on which the sifter can is placed when at rest.

7 represents a crank-axle whose off journal 8 works in the perforate bearing 9 in the far side of the can, and its nigh journal 10, has its tube bearing 11, in the sleeve 12, which sleeve has its perforate bearing 13, in the nigh side of the machine. 14 represents semi-circular beating wires, whose ends are fast seated in the sockets 15 in the collar hubs 16, which hubs are themselves fast seated on said crank axle 7, within close working distance inside said semi-spheric screen 3. 17 represents the crank on said axle 7, and 18 is the knob-handle by which said crank axle and the semi-spheric beaters are turned to agitate the flour, while sifting.

I now come to important elements of my device, which, in conjunction with the said sleeve 12, prevent the escape of the flour from the can when not sifting and which also by an alternating change of position prevents the upward escape of the agitated cloud dust of flour from the top of the can while sifting.

19 represents a semi-spheric, preferably metal cup, which has perforate projecting lugs 20 on each of its journal attached sides. The off side lug has a loose bearing 21 on near the off end of the axle 7, and the nigh side lug has a tight bearing 22 on said sleeve 12.

23 represents a crank handle arm, which is fast mounted on the sleeve 12, to which sleeve it is rigidly secured by the key pin 24, which pin is seated in the key-hole 25 in said crank arm and sleeve, and thus locks them together. 26 represents a counter extension arm, integral with said crank arm 23, and which extends in the reverse direction to said crank handle end. The said combined crank handle and counter extension arm, is made of a concavo-convex form, its concave side 27 facing toward the flour-can, and the said facing side, at its ends has convex runner crooks 28, that as said arm attains its vertical position, exert a slight hold against the side of the can and hold it there. 29 is the knob handle on the operative end of said crank-arm 23, by which it is turned.

The operations of the especial devices in this apparatus that prevent the illegitimate escape of flour, when and where it is not required to be deposited in sifting, as an attachment to rotary flour sifters, are as follows:—
The metal semi-spherical cup 19 having, by means of one of its perforate lugs a loose bearing on the crank-axle 7, and its other perforate lug having a flat bearing on the sleeve 12 which sleeve has a loose bearing in said crank axle, and as the crank arm 23 is fast mounted and keyed on said sleeve 12, it follows that said crank arm is enabled to control the alternation in position of said semi-spheric cup from that of a tight bottom, to prevent the escape of the flour, to the screen or sieve and from that its escape from the can, as shown in full lines in Fig. II, previous to starting the rotary sifter, on the one hand, to that of a tight cover, as shown in full lines in Fig. III, and in broken lines in Fig. II, to prevent the discharge of fine particles of the flour from the top, consequent on the agitation of sifting. The peripheral rim of said semi-spheric cup, approximately fits inside the flour-can, so that although it has free action in alternating, yet it substantially presents an effective stay against the illegitimate escape of the flour. It will further be seen, that when said crank arm 23 is turning said semi-spheric cup, to alternate it from a tight bottom to a tight cover, and vice versa, the convex runner crooks 28 of said arm and of its counter extension, do not come in contact with the flour can, until said cup reaches either its location as a tight bottom, (see Fig. II) or on the other hand, its position as a tight cover, (see Fig. III,) at which time said convex crooks come in contact with the can and friction-lock the cup in either of its alternate locations.

The sleeve 12 may be square seated in the crank arm 23, and tightened thereon when so required.

I claim as my invention:—

1. In a flour sifter, the combination of the can, the adjustable axially mounted revoluble hemispherical cup 19, free to oscillate back and forth and conforming to the interior of the can and the crank arm 23, by which said cup is alternated to effect respectively a tight bottom and cover; substantially as described.—

2. In a flour sifter, the combination of the semi-spheric cup 19, the can 1, within which said cup is axially mounted, the combined crank arm 23 and counter extension 26, having the friction runner crooks 28, the said crank arm arranged to transpose said cup into its alternate positions to effect respectively a tight bottom and top, and said runner crooks 28, friction-locking said cup in said respective operating positions; substantially as described.

3. In a flour sifter, the combination of the flour can, the crank axle 7, the wire screen, the rotary beaters fast mounted on said axle, the sleeve 12 loosely mounted on said axle, the alternating cup 19 loosely mounted on said axle and fast mounted on said sleeve, and the crank arm 23 fast mounted on said sleeve; substantially as described.

4. In a flour sifter, the combination of the can 1, the crank axle 7, having its crank 17, the wire screen 3, the rotating beaters, 14, the sleeve 12 loosely mounted on said axle, the semi-spheric cup 19, loosely mounted on said axle and fast mounted on said sleeve, the crank arm 23, having the counter extension 26, the key pin 24 that locks said crank arm to said sleeve 12, and the runner crooks 28 on said crank arm, and its extension, that friction-lock said cup in its respective bottom and cover positions; substantially as described.

PRISCILLA M. BURNS.

In presence of—
BENJN. A. KNIGHT,
SAML. KNIGHT.